United States Patent
Ozawa et al.

(10) Patent No.: US 7,023,858 B2
(45) Date of Patent: Apr. 4, 2006

(54) DATA DELIVERY IN SET-TOP BOX

(75) Inventors: Toshiro Ozawa, San Diego, CA (US); David Kimble, Escondido, CA (US)

(73) Assignees: Sony Corporation, (JP); Sony Electronics Inc., Park Ridge, NJ (US)

( * ) Notice: Subject to any disclaimer, the term of this patent is extended or adjusted under 35 U.S.C. 154(b) by 775 days.

(21) Appl. No.: 09/809,850

(22) Filed: Mar. 16, 2001

(65) Prior Publication Data

US 2001/0030959 A1 Oct. 18, 2001

Related U.S. Application Data

(63) Continuation-in-part of application No. 09/775,692, filed on Feb. 2, 2001.

(60) Provisional application No. 60/197,848, filed on Apr. 14, 2000, provisional application No. 60/197,320, filed on Apr. 14, 2000, provisional application No. 60/197,310, filed on Apr. 14, 2000, provisional application No. 60/197,308, filed on Apr. 14, 2000, provisional application No. 60/197,233, filed on Apr. 14, 2000, provisional application No. 60/197,234, filed on Apr. 14, 2000, provisional application No. 60/197,320, filed on Apr. 14, 2000.

(51) Int. Cl.
*H04L 12/56* (2006.01)

(52) U.S. Cl. ............... 370/399; 370/386; 370/395.5; 370/396; 370/397; 370/398; 370/401; 370/409; 370/466; 370/474

(58) Field of Classification Search ............... 370/386, 370/395.5, 466, 474, 401, 409, 395.1, 396, 370/397, 398, 399
See application file for complete search history.

(56) References Cited

U.S. PATENT DOCUMENTS

| | | | | |
|---|---|---|---|---|
| 5,650,994 A | * | 7/1997 | Daley | 370/259 |
| 5,666,487 A | * | 9/1997 | Goodman et al. | 709/246 |
| 5,734,589 A | * | 3/1998 | Kostreski et al. | 715/716 |
| 5,793,413 A | * | 8/1998 | Hylton et al. | 725/81 |
| 5,826,166 A | * | 10/1998 | Brooks et al. | 725/134 |
| 6,041,056 A | * | 3/2000 | Bigham et al. | 370/395.64 |
| 6,628,891 B1 | * | 9/2003 | Vantalon et al. | 386/94 |

* cited by examiner

*Primary Examiner*—Ricky Q. Ngo
*Assistant Examiner*—Kevin Mew
(74) *Attorney, Agent, or Firm*—Miller Patent Services; Jerry A. Miller

(57) ABSTRACT

A method and apparatus for managing ATM formatted MPEG SI data in a television set-top box. A virtual channel indicator (VCI) is used to associate a segment of SI data with a virtual channel. An ATM processor receives a stream of ATM packets containing SI data from an out-of-band tuner. The ATM packets include the VCI in a header thereof. The ATM processor stores the SI data in a buffer memory associated with the VCI for retrieval by the ATM processor at the request of the STB system processor.

33 Claims, 4 Drawing Sheets

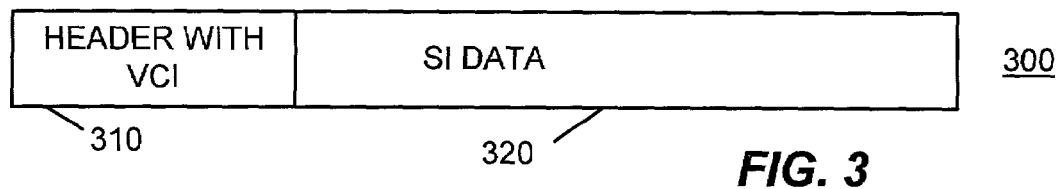
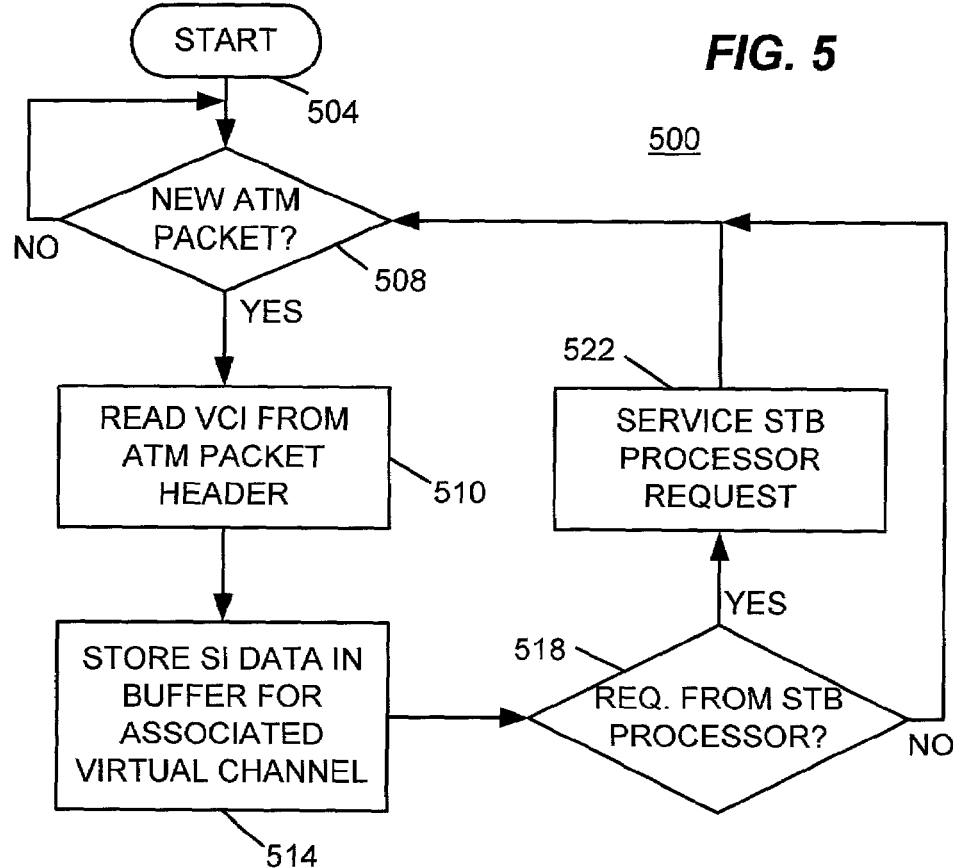
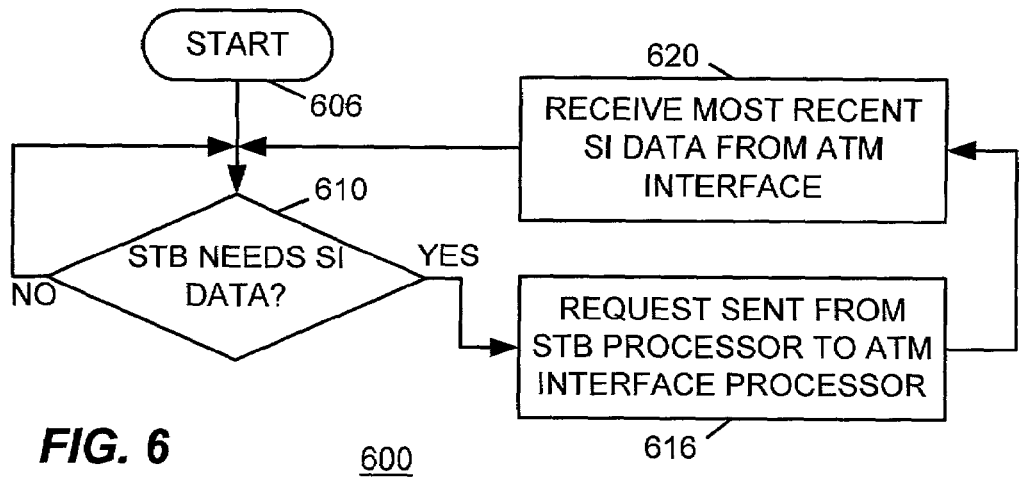

DATA DELIVERY IN SET-TOP BOX

CROSS REFERENCE TO RELATED DOCUMENTS

This application is related to and claims priority benefit under 35 U.S.C. § 119(e) or 35 U.S.C. § 120 of Provisional Patent Application 60/197,848, filed Apr. 14, 2000, and entitled "User Interface for a Set-Top Box", Provisional Patent Application 60/197,308, filed Apr. 14, 2000, and entitled "Method for VOD", Provisional Patent Application 60/197,233, filed Apr. 14, 2000, and entitled "Cable Modem Set Top Box", Provisional Patent Application 60/197,234, filed Apr. 14, 2000, and entitled "Web Based EPG Support", and Provisional Patent Application 60/197,310, filed Apr. 14, 2000, and entitled "Support for tuning while viewing a Web Based EPG", and is a continuation-in-part of U.S. patent application Ser. No. 09/775,692 filed Feb. 2, 2001 entitled "Web Browser Plug in for TV" to Kimble et al. which are each hereby incorporated by reference. U.S. patent application Ser. No. 09/473,625, filed Dec. 29, 1999, entitled "Improved Internet Set-Top Box Having and In-Band Tuner and Cable Modem" is also hereby incorporated herein by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

This invention relates generally to the field of television and television set-top boxes. More particularly, this invention relates to a method and apparatus for handling MPEG (Moving Pictures Expert Group) and other SI (Service Information) data formatted in ATM packets.

BACKGROUND OF THE INVENTION

MPEG SI data are conventionally time multiplexed into an MPEG transport stream for use in the decoding process. The SI data are conventionally demultiplexed from the transport stream and filtered for use by a system processor as needed. This is generally accomplished by use of the Packet Identifier (PID) in the transport stream packet with further filtering done using a Table ID, section number, version number, etc. once it has been reformatted as MPEG section data. However, in certain applications, the SI data may not be time multiplexed with the video data. In such cases, there should be some mechanism to ultimately get the SI data to a system processor in an efficient manner that neither overloads the system processor nor places undue performance requirements on the system processor.

Further information regarding SI data and the conventional demultiplexing thereof can be found in DVB-SI Specification EN300 468, MPEG System Specification ISO/IEC 13818-01 which are hereby incorporated by reference.

SUMMARY OF THE INVENTION

The present invention relates generally to handling MPEG SI data formatted in ATM packets. Objects, advantages and features of the invention will become apparent to those skilled in the art upon consideration of the following detailed description of the invention.

In one exemplary embodiment of the present invention a method and apparatus for managing ATM formatted MPEG or other SI data in a television set-top box is provided. A virtual channel indicator (VCI) is used to associate a segment of SI data with a virtual channel. An ATM processor receives a stream of ATM packets containing SI data from an out-of-band tuner. The ATM packets include the VCI in a header thereof. The ATM processor stores the SI data in a buffer memory associated with the VCI for retrieval by the ATM processor at the request of the STB system processor.

A method of managing MPEG (Moving Pictures Expert Group) SI (Service Information) data according to another exemplary embodiment includes receiving an Asynchronous Transfer Mode (ATM) packet containing SI data, the ATM packet having a virtual channel indicator (VCI) in a header thereof associating the SI data in the packet with a virtual channel; storing the SI information in a memory associated with the VCI; and retrieving the SI information from the memory upon request of a system processor.

A television or television set-top box consistent with an embodiment of the invention has a receiver receiving a video data stream including MPEG (Moving Pictures Expert Group) video data and converting the MPEG video data to a video signal. An ATM (Asynchronous Transfer Mode) interface, receives a stream of ATM packets frequency multiplexed with the video data stream, the ATM packets carrying MPEG or other SI (Service Information) data and having a header carrying a virtual channel indicator (VCI), the VCI associating the SI data with a virtual channel. The ATM interface includes an ATM processor and a plurality of buffer memories, one buffer memory for each of a plurality of virtual channels. Upon receipt of an ATM packet, the ATM processor reads the ATM packet's VCI and stores SI information associated with that VCI in the buffer memory for the virtual channel indicated by the VCI.

In another embodiment consistent with the present invention, a method of supplying MPEG (Moving Pictures Expert Group) or other SI (Service Information) data over a cable network includes associating an SI data segment with a virtual channel identifier (VCI); packaging the SI data segment in a data area of an ATM (Asynchronous Transfer Mode) packet; placing the VCI in a header of the ATM packet; and transmitting the packet over the cable network.

The above summaries are intended to illustrate exemplary embodiments of the invention, which will be best understood in conjunction with the detailed description to follow, and are not intended to limit the scope of the appended claims.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

FIG. 3 illustrates an ATM packet carrying SI data.

FIG. 5 is a flow chart describing operation of the ATM interface 188.

FIG. 6 is a flow chart of the operation of the CPU 132 retrieving data from the ATM interface 188.

DETAILED DESCRIPTION OF THE INVENTION

Figure 1:
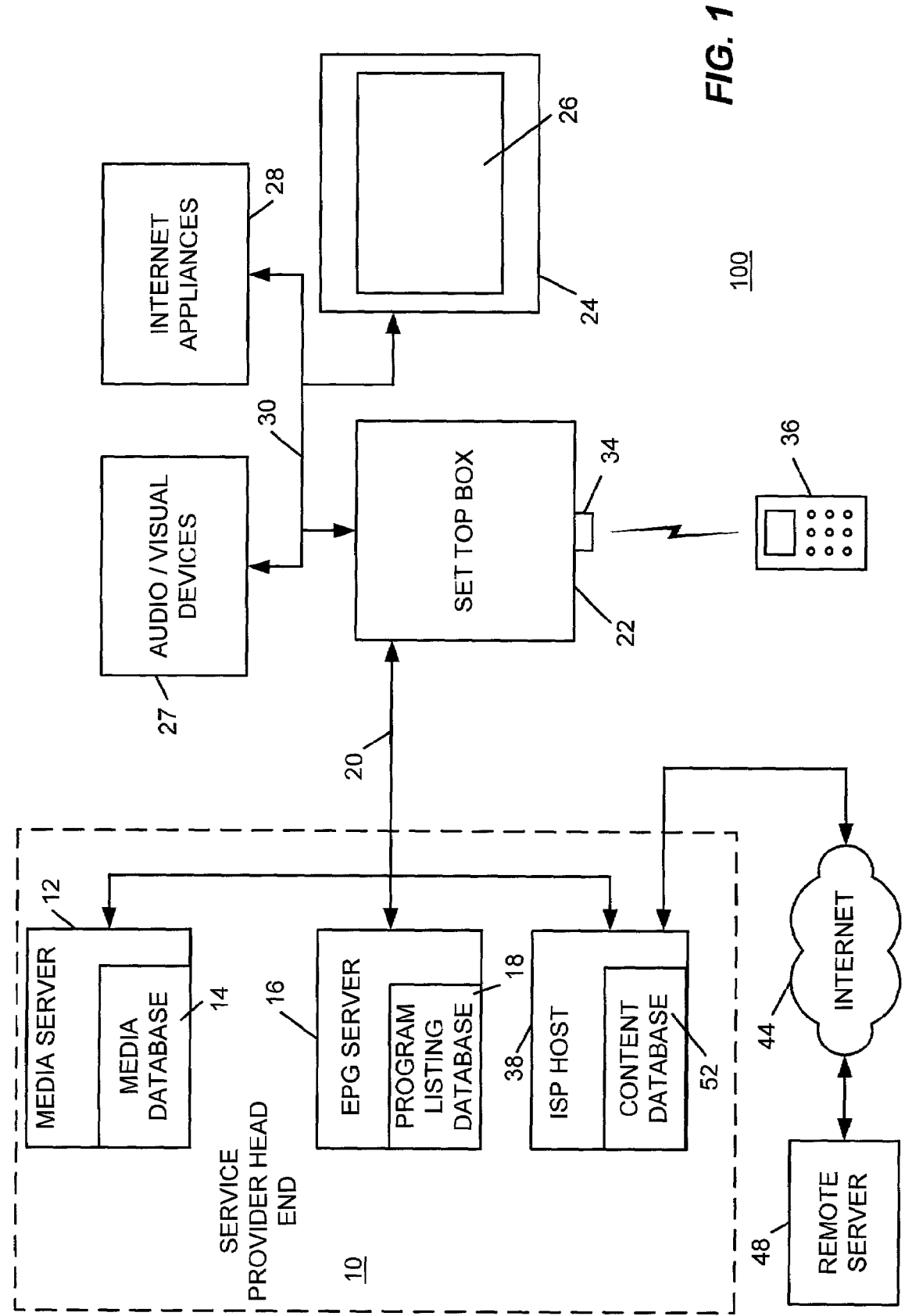
FIG. 1 is a system block diagram of a system using a set-top box.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Referring to FIG. 1, a block diagram for an exemplary interactive cable or satellite television (TV) system 100 is shown. The system 100 includes, at a head end of the service provider 10, a media server 12 for providing, on demand, movies and other programming obtained from a media database 14. The media server 12 might also provide additional content such as interviews with the actors, games, advertisements, available merchandise, associated Web pages, interactive games and other related content. The system 100 also includes an electronic programming guide (EPG) server 16 and a program listing database 18 for generating an EPG. Set-top box 22 can generally provide for bidirectional communication over a transmission medium 20 in the case of a cable STB 22. In other embodiments, bidirectional communication can be effected using asymmetrical communication techniques possibly using dual communication media—one for the uplink and one for the downlink. In any event, the STB 22 can have its own Universal Resource Locator (URL) or IP address or other unique identifier assigned thereto to provide for addressability by the head end and users of the Internet.

The media server 12 and EPG server 16 are operatively coupled by transmission medium 20 to a set-top box (STB) 22. The transmission medium 20 may include, for example, a conventional coaxial cable network, a fiber optic cable network, telephone system, twisted pair, a satellite communication system, a radio frequency (RF) system, a microwave system, other wireless systems, a combination of wired and wireless systems or any of a variety of known electronic transmission mediums. In the case of a cable television network, transmission medium 20 is commonly realized at the subscriber's premises as a coaxial cable that is connected to a suitable cable connector at the rear panel of the STB 22. In the case of a Direct Satellite System (DSS), the STB 22 is often referred to as an Integrated Receiver Decoder (IRD). In the case of a DSS system, the transmission medium is a satellite transmission at an appropriate microwave band. Such transmissions are typically received by a satellite dish antenna with an integral Low Noise Block (LNB) that serves as a down-converter to convert the signal to a lower frequency for processing by the STB 22.

The exemplary system 100 further includes a TV 24, such as a digital television, having a display 26 for displaying programming, an EPG, etc. The STB 22 may be coupled to the TV 24 and various other audio/visual devices 27 (such as audio systems, Personal Video Recorders (PVRs), Video Tape Recorders (VTRs), Video Cassette Recorders (VCRs) and the like), storage devices (e.g., hard disc drives) and Internet Appliances 28 (such as email devices, home appliances, storage devices, network devices, and other Internet Enabled Appliances) by an appropriate interface 30, which can be any suitable analog or digital interface. In one embodiment, interface 30 conforms to an interface standard such as the Institute of Electrical and Electronics Engineers (IEEE) 1394 standard, but could also be wholly or partially supported by a DVI interface (Digital Visual Interface-Digital Display Working Group, www.ddwg.org) or other suitable interface.

The STB 22 may include a central processing unit (CPU) such as a microprocessor and memory such as Random Access Memory (RAM), Read Only Memory (ROM), flash memory, mass storage such as a hard disc drive, floppy disc drive, optical disc drive or may accommodate other electronic storage media, etc. Such memory and storage media is suitable for storing data as well as instructions for programmed processes for execution on the CPU, as will be discussed later. Information and programs stored on the electronic storage media or memory may also be transported over any suitable transmission medium such as that illustrated as 20. STB 22 may include circuitry suitable for audio decoding and processing, the decoding of video data compressed in accordance with a compression standard such as the Motion Pictures Experts Group (MPEG) standard and other processing to form a controller or central hub. Alternatively, components of the STB 22 may be incorporated into the TV 24 itself, thus eliminating the STB 22. Further, a computer having a tuner device and modem may be equivalently substituted for the TV 24 and STB 22.

By way of example, the STB 22 may be coupled to devices such as a personal computer, video cassette recorder, camcorder, digital camera, personal digital assistant and other audio/visual or Internet related devices. In addition, a data transport architecture, such as that set forth by an industry group which includes Sony Corporation and known as the Home Audio-Video Interoperability (HAVi) architecture may be utilized to enable interoperability among devices on a network regardless of the manufacturer of the device. This forms a home network system wherein electronic devices and Internet appliances are compatible with each other. The STB 22 runs an operating system suitable for a home network system such as Sony Corporation's Aperios™ real time operating system. Other operating systems could also be used.

The STB 22 includes an infrared (IR) receiver 34 for receiving IR signals from an input device such as remote control 36. Alternatively, it is noted that many other control communication methods may be utilized besides IR, such as wired or wireless radio frequency, etc. In addition, it can be readily appreciated that the input device 36 may be any device suitable for controlling the STB 22 such as a remote control, personal digital assistant, laptop computer, keyboard or computer mouse. In addition, an input device in the form of a control panel located on the TV 24 or the STB 22 can be provided.

The STB 22 may also be coupled to an independent service provider (ISP) host 38 by a suitable connection including dial-up connections, DSL (Digital Subscriber Line) or the same transmission medium 20 described above (e.g., using a cable modem) to, thus, provide access to services and content from the ISP and the Internet. The ISP host 38 provides various content to the user that is obtained from a content database 52. STB 22 may also be used as an Internet access device to obtain information and content from remote servers such as remote server 48 via the Internet 44 using host 38 operating as an Internet portal, for example. In certain satellite STB environments, the data can be downloaded at very high speed from a satellite link, with asymmetrical upload speed from the set-top box provided via a dial-up or DSL connection.

While the arrangement illustrated in FIG. 1 shows a plurality of servers and databases depicted as independent devices, any one or more of the servers can operate as server software residing on a single computer. Moreover, although not explicitly illustrated, the servers may operate in a coordinated manner under centralized or distributed control to provide multiple services as a Multiple Service Operator (MSO) in a known manner. Additionally, the services provided by the servers shown in FIG. 1 may actually reside in other locations, but from the perspective of the user of STB 22, the service provider 10 serves as a portal to the services shown. Those skilled in the art will appreciate that the illustration of FIG. 1 represents a simplified depiction of a cable system configuration shown simply as service provider 10. The actual configuration of the service provider's equipment is more likely to follow a configuration defined by the CableLabs OpenCable™ specification. The simplified illustration shown is intended to simplify the discussion of the service provider 10's operation without unnecessarily burdening the discussion with architectural details that will be evident to those skilled in the art. Those details can be found in the publicly available CableLabs OpenCable™ specification or in the text "OpenCable Architecture (Fundamentals)" by Michael Adams, Cisco Press, November 1999.

Figure 2:
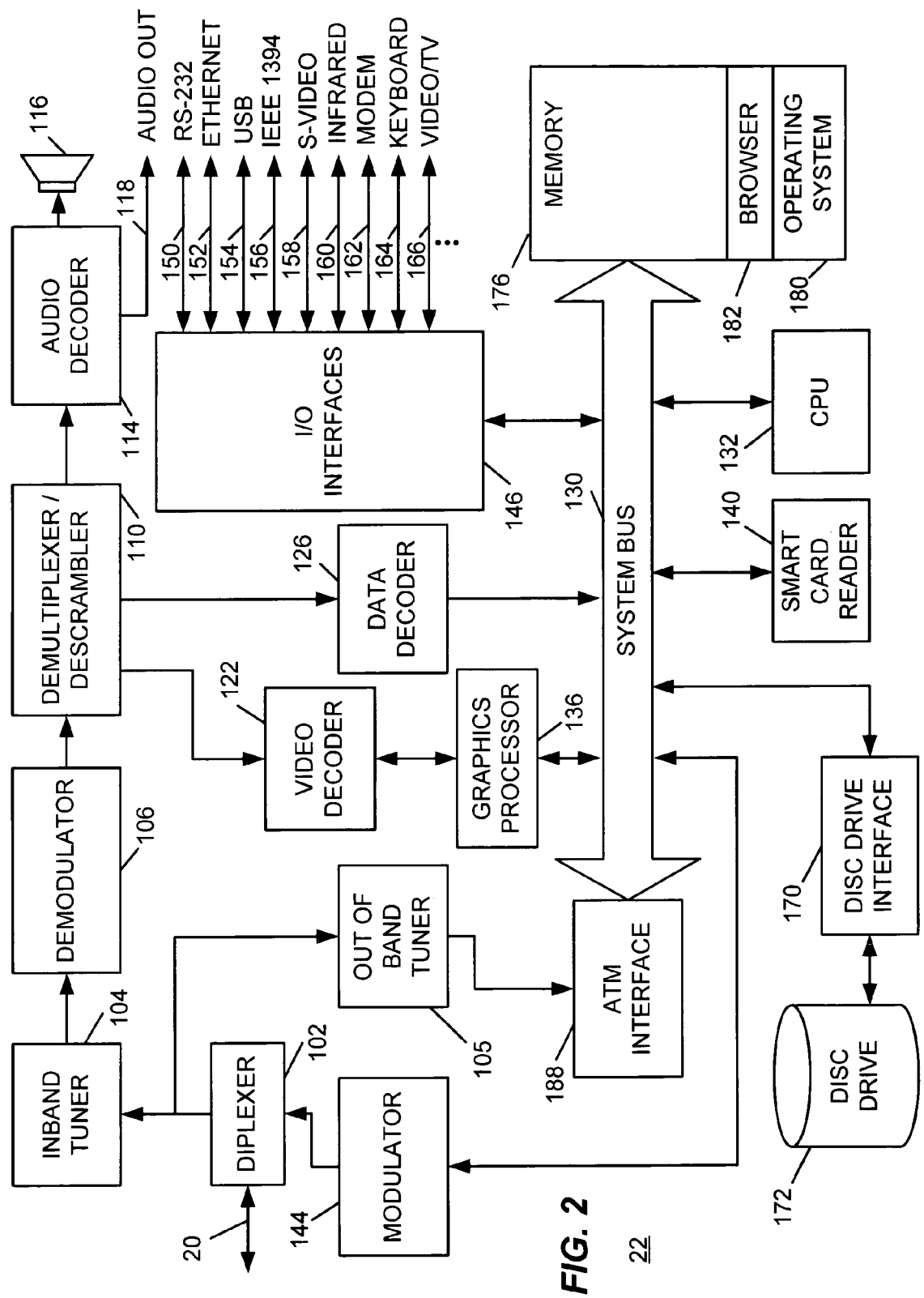
FIG. 2 is a functional block diagram of a digital set-top box suitable for use with the present invention.

Referring now to FIG. 2, a typical system configuration for a digital set-top box 22 is illustrated. In this exemplary set-top box, the transmission medium 20, such as a coaxial cable, is coupled by a suitable interface through a diplexer 102 to an in-band tuner 104. Tuner 104 may, for example, include a broadcast in-band tuner for receiving video content. An out-of-band (OOB) tuner 105 is provided for receiving data transmissions, including ATM formatted SI data. A return path through diplexer 102 provides an OOB return path for outbound data (destined for example for the head end). A separate tuner (not shown) may be provided to receive conventional RF broadcast television channels. Modulated information formatted, for example, as MPEG-2 information is then demodulated at a demodulator 106. The demodulated information at the output of demodulator 106 is provided to a demultiplexer and descrambler circuit 110 where the information is separated into discrete channels of programming. The programming is divided into packets, each packet bearing an identifier called a Packet ID (PID) that identifies the packet as containing a particular type of data (e.g., audio, video, data). The demodulator and descrambler circuit 110 also decrypts encrypted information in accordance with a decryption algorithm to prevent unauthorized access to programming content, for example.

Audio packets from the demultiplexer 110 (those identified with an audio PID) are decrypted and forwarded to an audio decoder 114 where they may be converted to analog audio to drive a speaker system (e.g., stereo or home theater multiple channel audio systems) or other audio system 116 (e.g., stereo or home theater multiple channel amplifier and speaker systems) or may simply provide decoded audio out at 118. Video packets from the demultiplexer 110 (those identified with a video PID) are decrypted and forwarded to a video decoder 122. In a similar manner, data packets from the demultiplexer 110 (those identified with a data PID) are decrypted and forwarded to a data decoder 126.

Decoded data packets from data decoder 126 are sent to the set-top box's computer system via the system bus 130. A central processing unit (CPU) 132 can thus access the decoded data from data decoder 126 via the system bus 130. Video data decoded by video decoder 122 is passed to a graphics processor 136, which is a computer optimized to processes graphics information rapidly. Graphics processor 136 is particularly useful in processing graphics intensive data associated with Internet browsing, gaming and multimedia applications such as those associated with MHEG (Multimedia and Hypermedia information coding Experts Group) set-top box applications. It should be noted, however, that the function of graphics processor 136 may be unnecessary in some set-top box designs having lower capabilities, and the function of the graphics processor 136 may be handled by the CPU 132 in some applications where the decoded video is passed directly from the demultiplexer 110 to a video encoder. Graphics processor 136 is also coupled to the system bus 130 and operates under the control of CPU 132.

Many set-top boxes such as STB 22 may incorporate a smart card reader 140 for communicating with a so called "smart card," often serving as a Conditional Access Module (CAM). The CAM typically includes a central processor unit (CPU) of its own along with associated RAM and ROM memory. Smart card reader 140 is used to couple the system bus of STB 22 to the smart card serving as a CAM (not shown). Such smart card based CAMs are conventionally utilized for authentication of the user and authentication of transactions carried out by the user as well as authorization of services and storage of authorized cryptography keys. For example, the CAM can be used to provide the key for decoding incoming cryptographic data for content that the CAM determines the user is authorized to receive.

STB 22 can operate in a bidirectional communication mode so that data and other information can be transmitted not only from the system's head end to the end user, or from a service provider to the end user of the STB 22, but also, from the end user upstream using an out-of-band channel. In one embodiment, such data passes through the system bus 130 to a modulator 144 through the diplexer 102 and out through the transmission medium 20. This capability is used to provide a mechanism for the STB 22 and/or its user to send information to the head end (e.g., service requests or changes, registration information, etc.) as well as to provide fast outbound communication with the Internet or other services provided at the head end to the end user.

Set-top box 22 may include any of a plurality of I/O (Input/Output) interfaces represented by I/O interfaces 146 that permit interconnection of I/O devices to the set-top box 22. By way of example, and not limitation, a serial RS-232 port 150 can be provided to enable interconnection to any suitable serial device supported by the STB 22's internal software. Similarly, communication with appropriately compatible devices can be provided via an Ethernet port 152, a USB (Universal Serial Bus) port 154, an IEEE 1394 (so-called firewire™ or i-link™) or IEEE 1394 wide port 156, S-video port 158 or infrared port 160. Such interfaces can be utilized to interconnect the STB 22 with any of a variety of accessory devices such as storage devices, audio/visual devices 27, gaming devices (not shown), Internet Appliances 28, etc.

I/O interfaces 146 can include a modem (be it dial-up, cable, DSL or other technology modem) having a modem port 162 to facilitate high speed or alternative access to the Internet or other data communication functions. In one preferred embodiment, modem port 162 is that of a DOCSIS (Data Over Cable System Interface Specification) cable modem to facilitate high speed network access over a cable system, and port 162 is appropriately coupled to the transmission medium 20 embodied as a coaxial cable. Thus, the STB 22 can carry out bidirectional communication via the DOCSIS cable modem with the STB 22 being identified by a unique IP address. The DOCSIS specification is publically available.

A PS/2 or other keyboard/mouse/joystick interface such as 164 can be provided to permit ease of data entry to the STB 22. Such inputs provide the user with the ability to easily enter data and/or navigate using pointing devices. Pointing devices such as a mouse or joystick may be used in gaming applications.

Of course, STB 22 also may incorporate basic video outputs 166 that can be used for direct connection to a television set such as 24 instead of (or in addition to) an IEEE 1394 connection such as that illustrated as 30. In one embodiment, Video output 166 can provide composite video formatted as NTSC (National Television System Committee) video. In some embodiments, the video output 166 can be provided by a direct connection to the graphics processor 136 or the demultiplexer/descrambler 110 rather than passing through the system bus 130 as illustrated in the exemplary block diagram. S-Video signals from output 158 can be similarly provided without passing through the system bus 130 if desired in other embodiments.

The infrared port 160 can be embodied as an infrared receiver 34 as illustrated in FIG. 1, to receive commands from an infrared remote control 36, infrared keyboard or other infrared control device. Although not explicitly shown, front panel controls may be used in some embodiments to directly control the operation of the STB 22 through a front panel control interface as one of interfaces 146. Selected interfaces such as those described above and others can be provided in STB 22 in various combinations as required or desired.

STB 22 will more commonly, as time goes on, include a disc drive interface 170 and disc drive mass storage 172 for user storage of content and data as well as providing storage of programs operating on CPU 132. STB 22 may also include floppy disc drives, CD ROM drives, CD R/W drives, DVD drives, etc. CPU 132, in order to operate as a computer, is coupled through the system bus 130 (or through a multiple bus architecture) to memory 176. Memory 176 may include a combination any suitable memory technology including Random Access Memory (RAM), Read Only Memory (ROM), Flash memory, Electrically Erasable Programmable Read Only Memory (EEPROM), etc.

While the above exemplary system including STB 22 is illustrative of the basic components of a digital set-top box suitable for use with the present invention, the architecture shown should not be considered limiting since many variations of the hardware configuration are possible without departing from the present invention. The present invention could, for example, also be implemented in more advanced architectures such as that disclosed in U.S. patent application Ser. No. 09/473,625, filed Dec. 29, 1999, Docket No. SONY-50N3508 entitled "Improved Internet Set-Top Box Having and In-Band Tuner and Cable Modem" to Jun Maruo and Atsushi Kagami. This application describes a set-top box using a multiple bus architecture with a high level of encryption between components for added security. This application is hereby incorporated by reference as though disclosed fully herein.

In general, during operation of the STB 22, an appropriate operating system 180 such as, for example, Sony Corporation's Aperios™ real time operating system is loaded into, or is permanently stored in, active memory along with the appropriate drivers for communication with the various interfaces. In other embodiments, other operating systems such as Microsoft Corporation's Windows CE™ could be used without departing from the present invention. Along with the operating system and associated drivers, the STB 22 usually operates using browser software 182 in active memory or may permanently reside in ROM, EEPROM or Flash memory, for example. The browser software 182 typically operates as the mechanism for viewing not only web pages on the Internet, but also serves as the mechanism for viewing an Electronic Program Guide (EPG) formatted as an HTML document. The browser 182 can also provide the mechanism for viewing normal programming (wherein normal programming is viewed as an HTML video window—often occupying the entire area of screen 26).

STB software architectures vary depending upon the operating system. However, in general, all such architectures generally include, at the lowest layer, various hardware interface layers. Next is an operating system layer as previously described. The software architectures of modern STB have generally evolved to include a next layer referred to as "middleware." Such middleware permits applications to run on multiple platforms with little regard for the actual operating system in place. Middleware standards are still evolving at this writing, but are commonly based upon Javascript and HTML (hypertext Markup Language) virtual machines. At the top layer is the application layer where user applications and the like reside (e.g., browsing, email, EPG, Video On Demand (VOD), rich multimedia applications, pay per view, etc.). The current invention can be utilized with any suitable set-top box software and hardware architecture.

In the present embodiment, the OOB tuner 105 receives ATM (Asynchronous Transfer Mode) packets which are DAVIC™ (Digital Audio Video Counsel) compliant. These packets are formatted as illustrated in FIG. 3 to provide SI data to an ATM interface 188. The ATM interface 188 provides the SI data as required to the CPU 132 as will be described in greater detail.

As will be appreciated by those skilled in the art, MPEG or other SI data are provided as a part of a digital data stream (the transport stream) carrying the video data in many applications. For example, in satellite systems, the SI data are multiplexed with the MPEG video data to provide a single data transport stream. The receiver demultiplexes this data stream according to a packet identifier (PID) and filters the SI data (e.g., by Table ID, section number, version number, etc.) once it has been reformatted as MPEG section data, to provide the central processor with only the SI data needed.

SI data provides the STB 22 with several types of information. Some of the information changes very slowly, such as channel mappings and service descriptions. Other information changes comparatively rapidly, such as time and synchronization information. However, the constant stream of information should generally be filtered before it is sent to the central processor to avoid overloading the processor. The demultiplexing function provided in satellite STBs carries out this function.

However, in accordance with cable television data provided using the DAVIC™ specification, the video data and the SI data are provided as separate frequency multiplexed data streams. Certain of the SI data (NIT, BAT, TOT, SDT) along with EMM (not SI data, but formatted the same in the present embodiment) are provided over the OOB channel formatted as ATM packets while the MPEG video data are transmitted inband for receipt by the inband tuner 104. Since the data are not time multiplexed with the video and formatted as MPEG transport stream packets, the demultiplexing function common in satellite STBs cannot be used. However, the persistent flow of SI data could similarly overload the CPU 132 (or require a more powerful and thus more expensive CPU) unless the problem is addressed.

The specifics of the data tables described above can be found in the European Telecommunications Standard Institute document EN 300 468 V1.3.1 (1998–02), at www.etsi.fr, or F-06921 Sophia Antipolis Cedex, France. But generally, the tables used in the preferred embodiment are as follows:

NIT—Network Information Table. This table provides frequency allocation and mapping information to identify which channel is broadcast on a specified frequency along with its Transport ID, etc.

SDT—Service Description Table. This table provides information about channels (called "services" in MPEG). Descriptions include service ID, service name, service description, etc.

TOT—Time Offset Table. This table provides current time information with time zones and daylight savings time information used to synchronize the STB clock with a head-end clock.

BAT—Boquet Association Table. A bouquet is basically a set of services (channels) offered to a certain group of STBs with the same bouquet ID. This table is used to assign differing channel mappings to STBs served by a common head end.

EMM—Entitlement Management Message. This is not a standard MPEG SI table but is widely used to facilitate conditional access and has a format similar to SI tables. This table tells the STB which channels a user or account has access to (i.e., which channels have been subscribed to).

While the above tables are the tables preferred in the present embodiment, they are not to be considered limiting. For purposes of this document, any MPEG standard SI tables or non-standard tables that can be dealt with in the same manner as an SI table are equivalent and can be considered an SI table.

In order to address this problem, the ATM packet 300 of FIG. 3 is formatted with a Virtual Channel Identifier(VCI) in the header 310 as illustrated with the SI data in the payload portion 320 of the packet 300. The VCI is a channel number that is associated with the SI data in 320 and is used to replace the functionality of the Packet ID and Table ID filtering using in an inband demultiplexer based system (section and version checking are done using the system processor in the present embodiment, but this is not to be limiting). The VCI and SI data are inserted in the ATM packet at the cable head end 10. The VCI serves a function similar to the PID in the satellite system to permit demultiplexing in the cable set-top box. That is, the OOB data are a stream of multiplexed SI data packets formatted as ATM data with the VCI providing the key to demultiplexing the data.

The VCI is a unique numerical tag (16 bits) in the ATM cell header. It identifies the virtual channel over which the cell is to travel. By assigning unique VCI values to every type of SI data (SI table), a similar function to the demultiplexer in the satellite systems, which identifies SI tables by their packet IDs and Table IDs. can be achieved.

Figure 4:
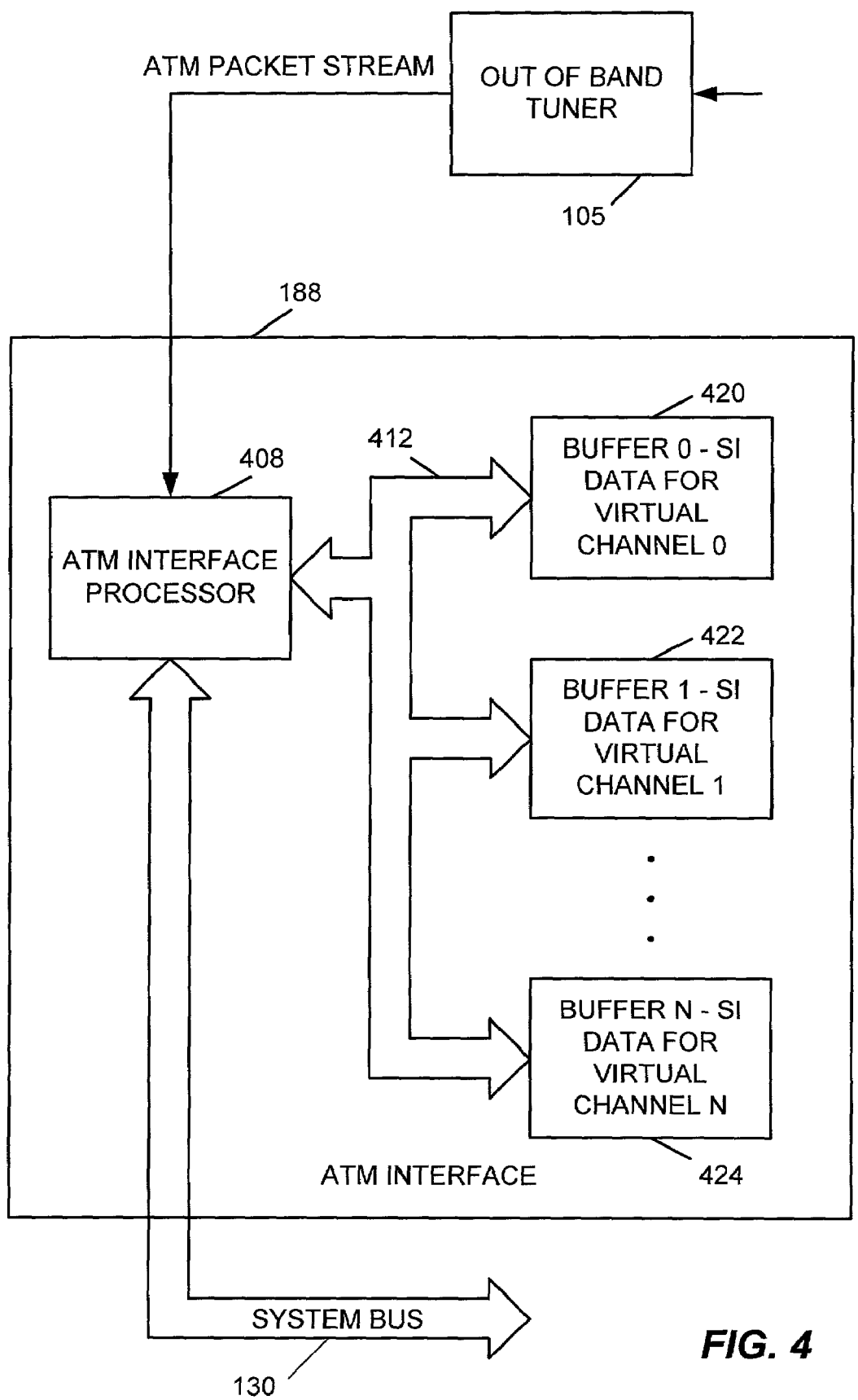
FIG. 4 is a block diagram of an embodiment of an ATM interface 188.

FIG. 4 illustrates, in greater detail, the demultiplexing action of the ATM interface 188 of the present invention. The ATM interface 188 has a processor 408 that is dedicated to handling the ATM packets. The ATM interface 188 also includes a bus 412 coupled to a plurality of buffer memories 420,422 through 424. One buffer memory or memory location is provided for each VCI. In one embodiment, sixteen VCIs are provided numbered 0–15, but this is not to be considered limiting. Processor 408 is also coupled to the system bus 130 in one embodiment, but could also be connected to a separate bus or other connection to CPU 132 (the main processor of the STB 22). Those skilled in the art will appreciate that buffer memories 420, 422 through 424 may be physically structured as separate buffers as shown, or as memory locations in a Random Access Memory (RAM) or in any other suitable hardware configuration without departing from the present invention.

In operation, a constant stream of ATM packets carrying SI data associated with a VCI is received from the OOB tuner 105 by the ATM interface processor 408. The processor receives these packets, reads the VCI and stores the SI data in the buffer memory associated with the VCI. The CPU 132 can obtain the SI data any time it is required by making a request of the ATM interface processor 408. This can be in the form of a message requesting the information or in the form of an interrupt directed to the ATM interface processor 408 or any other desired communication technique. In the embodiment shown, a request is placed on bus 130 by the CPU 132 and received by processor 408. The processor 408 then retrieves the appropriate information and places it on the bus 130 to CPU 132.

The processes outlined above are illustrated in connection with process 500 of FIG. 5 and process 600 of FIG. 6. Process 500 starts af 504 and awaits receipt of a new ATM packet from OOB tuner 105 at 508. When a packet is received at 508, the VCI is read from the packet header at 510 and the SI data are stored in the appropriate buffer, as determined by the VCI, at 514. Control then passes to 518 where a determination is made as to receipt of a request from the STB processor CPU 132. If no request has been made at 518, control returns to 508. If a request has been made, the CPU 1 32's request is serviced at 522 before control is returned to 508. Many variations of this process are possible. For example, requests from CPU 132 can be stored in a separate buffer that is periodically checked or an interrupt can be used to provide immediate service to either CPU 132 or to data from the OOB tuner 105. Moreover, data from the OOB tuner 105 can be cached for retrieval by processor 408 to avoid loss of data. Other variations will occur to those skilled in the art without departing from the present invention.

The process 600 of retrieving SI data at the STB CPU 132 shown in FIG. 6 starts at 606. When the CPU 132 needs SI data at 610, a request is sent from the CPU 132 to the ATM interface processor 408 at 616. The ATM interface processor 408 then retrieves the most recent SI data requested (522) and sends the data to CPU 132. The CPU 132 receives this data at 620 and control returns to 610.

By use of the present invention as described, the CPU 132 is spared the burden of being constantly bombarded with SI data in the form of ATM packets. Managing the ATM packets is handled by a separate processor that can be optimized for this purpose to provide the most recent SI data to the CPU 132. The buffer memories can be configured in various ways without departing from the invention. Additionally, ATM formatting of SI tables can be applied to both MPEG SI tables and other tables resembling MPEG SI tables so long as they provide system type information and can be similarly formatted within the ATM packets.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will appreciate that the program steps used to implement the embodiments described above can be implemented using disc storage as well as other forms of storage including Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention is preferably implemented using a programmed processor executing programming instructions that are broadly described above in flow chart form and can be stored as instructions on any suitable electronic storage medium. However, those skilled in the art will appreciate that the processes described above can be implemented in any number of variations and in many suitable programming languages without departing from the present invention. For example, the order of certain operations carried out can often be varied, and additional operations can be added without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method of managing digital video SI (Service information) data when said SI data are not time multiplexed in the same transport stream as its associated video data, comprising:
   receiving a digital video inband transport stream with video data for each program segregated by Packet Identifiers (PID), so that each program in the digital video inband transport stream is identified by an associated PID;
   wherein the digital video inband transport stream does not contain SI data associated with and time multiplexed with the digital video data;
   receiving an out of band Asynchronous Transfer Mode (ATM) packet containing the digital video SI data, the ATM packet having a virtual channel indicator (VCI) in a header thereof associating the type of SI data in the ATM packet with a virtual channel;
   storing the SI information in a memory associated with the VCI; and
   retrieving the SI information from the memory associated with the VCI upon request of a system processor.

2. The method according to claim 1, wherein the receiving and storing are carried out by an ATM packet processor.

3. The method according to claim 2, wherein the system processor comprises a main processor of a television set-top box.

4. The method according to claim 1, wherein the storing comprises storing the SI information in a buffer memory associated with the VCI.

5. The method according to claim 4, wherein the buffer memory is one of a plurality of buffer memories, each associated with one of the VCIs.

6. The method according to claim 1, wherein the ATM packet is received as one of a stream of ATM packets from an out-of-band tuner.

7. The method according to claim 1, wherein the VCI and SI data are formatted as an ATM packet at a cable television service provider head end.

8. The method according to claim 1, carried out in a television set-top box.

9. The method according to claim 1, carried out in a television system.

10. A television apparatus, comprising:
    a receiver receiving an MPEG digital video data transport stream including MPEG (Moving Pictures Expert Group) video data via an inband channel and converting the MPEG video data to a video signal, wherein said MPEG digital video transport stream does not contain SI (Service Information) data, and wherein each program in the MPEG digital video data transport stream is identified by an associated Packet identifier (PID);
    an ATM (Asynchronous Transfer Mode) interface, receiving a stream of ATM packets that are frequency multiplexed over an out of band channel with the video data stream, the ATM packets carrying SI data and having a header carrying a virtual channel indicator (VCI), the VCI associating the type of SI data with a virtual channel;
    the ATM interface comprising:
       an ATM processor;
       a plurality of buffer memories, one buffer memory for each of a plurality of virtual channels, each virtual channel associated with a type of SI data; and
    wherein, upon receipt of an ATM packet, the ATM processor reads the ATM packet's VCI and stores SI information associated with that VCI in the buffer memory for the virtual channel indicated by the VCI.

11. The apparatus according to claim 10, further comprising a system processor, wherein the system processor obtains the SI data by sending a request to the ATM processor and receiving the SI data as a reply.

12. The apparatus according to claim 10, wherein the ATM packet is received as one of a stream of ATM packets from an out-of-band tuner.

13. The apparatus according to claim 10, wherein the VCI and SI data are formatted as an ATM packet at a cable television service provider head end.

14. The apparatus according to claim 10, further comprising an in band tuner receiving video information.

15. The apparatus according to claim 11, wherein the system processor and the ATM processor are both coupled to a system bus, and wherein the request and reply are communicated over the system bus.

16. The apparatus according to claim 10, wherein the television apparatus comprises one of a television and a television set-top box.

17. A method of supplying digital video SI (Service Information) data over a cable network when said SI data are not time multiplexed in a transport stream with associated video data, comprising:
   associating an SI data segment of an SI table type with a virtual channel Identifier (VCI) specific to that SI table type;
   packaging the SI data segment in a data area of an ATM (Asynchronous Transfer Mode) packet;
   placing the VCI in a header of the ATM packet; and
   transmitting the packet via an out of band channel over the cable network that carries associated video data via an inband channel, wherein the video data are segregated by channel using Packet Identifiers (PIDs), so that each program in the digital video inband transport stream is identified by an associated PID.

18. The method according to claim 17, further comprising:
   receiving the ATM packet containing the SI data with the VCI in the header;
   storing the SI information in a memory associated with the VCI; and
   retrieving the SI information from the memory upon request of a system processor.

19. The method according to claim 18, wherein the receiving and storing are carried out by an ATM packet processor.

20. The method according to claim 19, wherein the system processor comprises a main processor of a television set-top box.

21. The method according to claim 18, wherein the storing comprises storing the SI information in a buffer memory associated with the VCI.

22. The method according to claim 21, wherein the buffer memory is one of a plurality of buffer memories, each associated with one of the VCIs.

23. The method according to claim 17, wherein the ATM pocket is transmitted as one of a stream of ATM packets.

24. The method according to claim 17, carded out in one of a television and a television set-top box.

25. An electronic storage medium containing instructions which, when executed on a programmed processor, carry out a method of managing digital video SI (Service Information) data when said SI data are not time multiplexed in the same transport stream as its associated video data, comprising:
   receiving a digital video inband transport stream with video data for each program segregated by Packet Identifiers (PID), so that each program in the digital video inband transport stream is identified it's associated PID;
   wherein the digital video inband transport stream does not contain SI data associated with and time multiplexed with the digital video data;
   receiving an out of band Asynchronous Transfer Mode (ATM) packet containing the digital video SI data, the ATM packet having a virtual channel indicator (VCI) in a header thereof associating the type of SI data in the ATM packet with a virtual channel;
   storing the SI information in a memory associated with the VCI; and
   retrieving the SI information from the memory associated with the VCI upon request of a system processor.

26. The electronic storage medium according to claim 25, wherein the receiving and storing are carried out by an ATM packet processor.

27. The electronic storage medium according to claim 26, wherein the system processor comprises a main processor of a Television Set-Top Box.

28. The electronic storage medium according to claim 25, wherein the storing comprises storing the SI information in a buffer memory associated with the VCI.

29. The electronic storage medium according to claim 28, wherein the buffer memory is one of a plurality of buffer memories, each associated with one of the VCIs.

30. The electronic storage medium according to claim 25, wherein the ATM packet is received as one of a stream of ATM packets from an out-of-band tuner.

31. The electronic storage medium according to claim 25, wherein the VCI and SI data are formatted as an ATM packet at a cable television service provider head end.

32. The electronic storage medium according to claim 25 forming a part of one of a television and a television set-top box.

33. A method of supplying digital video SI (Service Information) data over a cable television network wherein said SI data are not time multiplexed in the same transport stream as its associated video data, comprising:
   at a cable television system head end:
      associating an SI data segment of an SI table type with a virtual channel identifier (VCI) specific to that SI table type;
      packaging the SI data segment in a data area of an ATM (Asynchronous Transfer Mode) packet;
      placing the VCI in a header of the ATM packet;
      transmitting the ATM packet as part of a stream of ATM packets via an out of band channel over the cable television network that carries an associated video data transport stream via an inband channel, wherein the video data transport stream inband channel does not contain SI data, and wherein the video data for each program are segregated by channel using Packet Identifiers (PIDs), so that each program in the digital video inband transport stream is identified by it's associated PID;
   at a television set top box:
      receiving the video data transport stream via the inband channel;
      receiving a stream of ATM packets via an out of band channel;
      at an ATM packet processor of the set top box, receiving the ATM packet containing the SI data with the VCI in the header via the out of band channel and storing the SI information in a buffer memory that is specifically associated with that VCI and thus associated with the SI table type;
      wherein the storing comprising updating the SI table in the buffer memory with most recently received SI data;
      wherein the buffer memory is one of a plurality of buffer memories, each associated with one of the VCIs and thus one SI table type; and
      retrieving the SI information from the one of the plurality of buffer memories upon request of a system processor, wherein the system processor comprises a main processor of the television set-top box.

* * * * *

UNITED STATES PATENT AND TRADEMARK OFFICE
CERTIFICATE OF CORRECTION

| | | |
|---|---|---|
| PATENT NO. | : 7,023,858 B2 | Page 1 of 1 |
| APPLICATION NO. | : 09/809850 | |
| DATED | : April 4, 2006 | |
| INVENTOR(S) | : Ozawa et al. | |

It is certified that error appears in the above-identified patent and that said Letters Patent is hereby corrected as shown below:

In col. 10, line 45, delete "1 32's" and insert -- 132's, -- therefor.

Claims:

In Claim 10, col. 12, line 36, delete "identifier" and insert -- Identifier-- therefor.

In Claim 17, col. 13, line 11, delete "Identifier" and insert --identifier -- therefor.

In Claim 23, col. 13, line 43, delete "pocket" and insert -- packet -- therefor.

In Claim 24, col. 13, line 44, delete "carded" and insert -- carried -- therefor.

Signed and Sealed this

Twenty-fifth Day of July, 2006

JON W. DUDAS
*Director of the United States Patent and Trademark Office*